(12) United States Patent
Katsuma et al.

(10) Patent No.: US 8,169,700 B2
(45) Date of Patent: May 1, 2012

(54) REFLECTIVE SCREEN

(75) Inventors: Ryoji Katsuma, Matsumoto (JP); Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/009,955

(22) Filed: Jan. 20, 2011

(65) Prior Publication Data

US 2011/0194178 A1 Aug. 11, 2011

(30) Foreign Application Priority Data

Feb. 10, 2010 (JP) ................................ 2010-027634

(51) Int. Cl.
G03B 21/56 (2006.01)
G02B 27/00 (2006.01)
(52) U.S. Cl. ....................................... 359/459; 359/443
(58) Field of Classification Search .......... 359/443–459; 350/11, 129
See application file for complete search history.

(56) References Cited

U.S. PATENT DOCUMENTS

| 3,964,822 A * | 6/1976 | Yamashita ..................... 359/443 |
| 7,864,420 B2 * | 1/2011 | Shinbo et al. ................. 359/459 |
| 7,911,694 B1 * | 3/2011 | Katsuma et al. .............. 359/459 |
| 2009/0021828 A1 * | 1/2009 | Shinbo et al. ................. 359/443 |
| 2010/0039703 A1 * | 2/2010 | Akiyama ..................... 359/459 |
| 2010/0067107 A1 * | 3/2010 | Akiyama ..................... 359/459 |
| 2010/0157424 A1 * | 6/2010 | Katsuma et al. .............. 359/455 |

FOREIGN PATENT DOCUMENTS

JP 2006-215162 A 8/2006
* cited by examiner

Primary Examiner — Clayton E Laballe
Assistant Examiner — Kevin Butler
(74) Attorney, Agent, or Firm — AdvantEdge Law Group, LLC

(57) ABSTRACT

A reflective screen comprising: a projection surface on which an image light is projected, a plurality of unit structures provided on the projection surface, one of the plurality of unit structures being formed of a concavely curved surface or a convexly curved surface, a first reflection portion that reflects the image light incident thereon toward a preset field of view, the first reflection portion being provided on the concavely curved surface or on the convexly curved surface and a second reflection portion that reflects at least a part of the image light incident thereon toward a region outside the preset field of view, the second reflection portion being provided on the concavely curved surface or on the convexly curved surface.

5 Claims, 18 Drawing Sheets

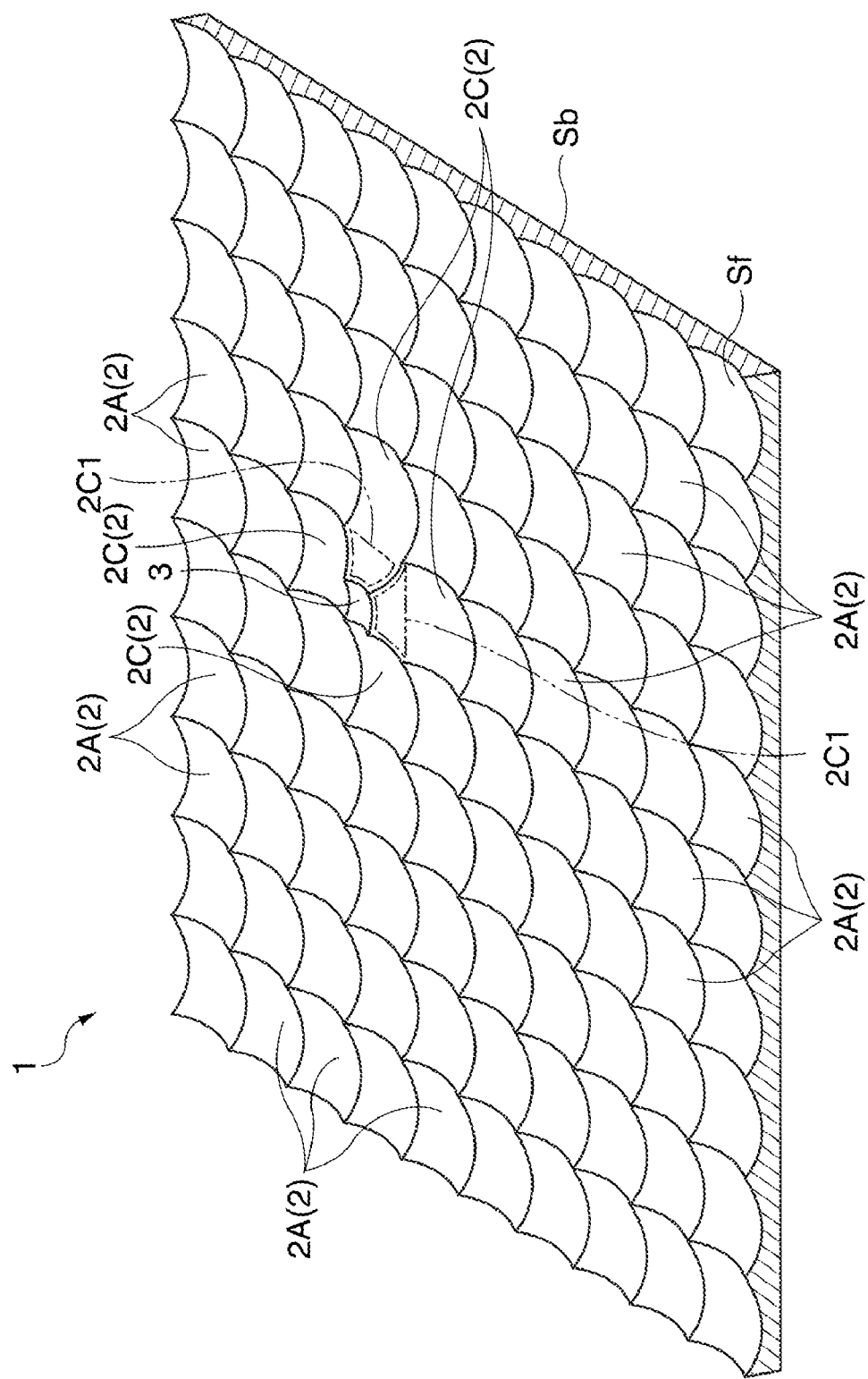

REFLECTIVE SCREEN

CROSS-REFERENCE TO RELATED APPLICATION

The entire disclosure of Japanese Patent Application No. 2010-27634, filed Feb. 10, 2010 is expressly incorporated by reference herein.

BACKGROUND

1. Technical Field

The present invention relates to a reflective screen.

2. Related Art

As a screen on which a projected image is displayed, there have been a variety of proposed screens that suppress decrease in contrast of the projected image due to external light from a fluorescent lamp or any other light source in conference rooms, school classrooms, and other bright room environments (see JP-A-2006-215162, for example).

The screen described in JP-A-2006-215162 has a plurality of convexly curved portions (hereinafter referred to as unit shaped portions) regularly disposed two-dimensionally on a projection surface. A reflection surface is formed on each of the unit shaped portions only in part of the surface thereof that faces incident image light.

In the configuration described above, the image light originating from a projector and incident on the screen obliquely upward is reflected off the reflection surface in each of the plurality of unit shaped portions, directed toward a side where a viewer visibly recognizes the image light. The viewer thus recognizes the image light as a projected image.

On the other hand, external light originating from the fluorescent lamp or any other light source and incident on the screen obliquely downward is not incident on the reflection surface in each of the plurality of unit shaped portions but is incident on and absorbed by the portion other than the reflection surface. That is, the external light will not be reflected off the screen toward the side where the viewer visibly recognizes the image light.

A screen that suppresses decrease in contrast, such as the screen described in JP-A-2006-215162, has a preset field of view across which a projected image can be visually recognized.

The tradeoff for a greater size of the field of view will be lower brightness of the projected image to be visually recognized. For example, the field of view needs to be narrowed in order to provide sufficient brightness of the projected image.

That is, when the size of the field of view is narrowed in order to provide sufficient brightness of the projected image, a problem occurs, for example, in a presentation. Specifically, a presenter tends to have difficulty in visually recognizing the projected image when the presenter stands close to the projection surface because the presenter who looks at the screen is outside the preset field of view. An audience outside the field of view also has difficulty in visually recognizing the projected image.

To make the projected image visually recognizable even in the situation described above, it is conceivable to simply enlarge the field of view, but the brightness of the projected image disadvantageously decreases as described above.

SUMMARY

An advantage of some aspects of the invention is to provide a reflective screen that makes a projected image visually recognizable even in a region outside a preset field of view while suppressing decrease in brightness of the projected image within a preset field of view.

A reflective screen according to an aspect of the invention includes a projection surface on which image light is projected, a plurality of unit structures provided on the projection surface, a first reflection portion that reflects the image light incident thereon toward a preset field of view and a second reflection portion that reflects at least a part of the image light incident thereon toward a region outside the preset field of view. One of the plurality of unit structures is formed of a concavely curved surface or a convexly curved surface. The first reflection portion is provided on the concavely curved surface or on the convexly curved surface. The second reflection portion is provided on the concavely curved surface or on the convexly curved surface.

In the aspect of the invention, the reflective screen includes the first reflection portion and the second reflection portion described above. That is, the image light incident on the screen is reflected off not only the first reflection portion toward the preset field of view but also the second reflection portion toward a region outside the preset field of view.

As a result, for example, even when a presenter who gives a presentation stands close to the projection surface and looks at the projection surface from a region outside the preset field of view, the presenter can recognize the image light reflected off the second reflection portions. Further, an audience in the region outside the preset field of view can also recognize the image light reflected off the second reflection portions.

Further, appropriately setting the positions, the area ratio, and other factors of the first and second reflection portions not only allows the luminance of the image light reflected off the first reflection portions to be maintained at a sufficiently high level, that is, decrease in brightness of a projected image within the preset field of view to be suppressed but also allows the image light reflected off the second reflection portions to be visually recognized as the projected image by a presenter standing close to the projection surface and an audience outside the preset field of view.

In the reflective screen according to the aspect of the invention, it is preferable that the second reflection portion has a light transmissive member provided on a reflection surface that reflects light, and that the image light is refracted in the light transmissive member so that at least part of the incident image light is reflected toward the region outside the preset field of view.

In the aspect of the invention, the second reflection portion uses, in order to reflect at least part of the incident image light toward the region outside the preset field of view, refraction of the image light in the light transmissive member provided on the reflection surface.

The screen can therefore be readily manufactured because the second reflection portions can be formed only by providing the light transmissive members on the projection surface of a screen of related art.

Further, appropriately setting the areas, positions, and other factors of the regions where the light transmissive members are formed advantageously not only allows the decrease in brightness of a projected image within the preset field of view described above to be suppressed but also allows the projected image to be visually recognized even in the region outside the preset field of view.

In the reflective screen according to the aspect of the invention, it is preferable that one of the plurality of unit structures is formed of the concavely curved surface having predetermined curvature, that the plurality of unit structures includes a plurality of first unit structures and a plurality of third unit structures, that one of the plurality of third unit structures has an extension surface extended from the concavely curved surface, the extension surface having an arcuate length longer than an arcuate length of one of the plurality of first unit structures in a cross-sectional view, and that the second reflection portion is provided on the extension surface.

In the aspect of the invention, the second reflection portion is provided on the extension surface of one of the plurality of third unit structures described above. That is, the image light is incident on the extension surface (second reflection portion) at a relatively large angle of incidence. As a result, the second reflection portion reflects at least part of the incident image light at a relatively large angle of reflection, that is, reflects the incident image light toward a region outside the preset field of view.

As a result, appropriately setting the number and position of the plurality of third unit structures, the area of the extension surface, and other factors advantageously not only allows the decrease in brightness of a projected image within the preset field of view described above to be suppressed but also allows the projected image to be visually recognized even in a region outside the preset field of view.

In the reflective screen according to the aspect of the invention, it is preferable that at least two third unit structures of the plurality of third unit structures are configured to be adjacent to each other, that the extension surfaces of the at least two third unit structures form a protrusion on the projection surface, the protrusion protruding outward from the projection surface, that the front end of the protrusion is formed of a concavely curved surface, and that a third reflection portion that reflects the image light incident thereon toward the preset field of view is provided on the front end of the protrusion.

In the aspect of the invention, the front end of the protrusion provided on the projection surface is formed of a concavely curved surface. The third reflection portion that reflects the image light incident thereon toward the preset field of view is provided on the front end.

The front end (third reflection portion) of the protrusion can therefore function in the same manner as the first reflection portion does, whereby decrease in brightness of a projected image within the preset field of view can be effectively suppressed.

In the reflective screen according to the aspect of the invention, it is preferable that at least two third unit structures of the plurality of third unit structures are configured to be adjacent to each other, that the extension surfaces of the at least two third unit structures form a protrusion on the projection surface, the protrusion protruding outward from the projection surface, that the front end of the protrusion is formed of a flat surface, and that a fourth reflection portion that reflects at least part of the image light incident thereon toward the region outside the preset field of view is provided on the front end of the protrusion.

In the aspect of the invention, the front end of the protrusion provided on the projection surface described above is formed of a flat surface. The fourth reflection portion that reflects at least part of the image light incident thereon toward the region outside the preset field of view is provided on the front end.

The front end (fourth reflection portion) of the protrusion can therefore function in the same manner as the second reflection portion does, whereby the brightness of a projected image in the region outside the preset field of view can be increased.

In the reflective screen according to the aspect of the invention, it is preferable that the second reflection portion undergos a diffusing process that allows the second reflection portion to diffuse and reflect light incident thereon so that at least part of the image light incident thereon is reflected toward the region outside the preset field of view.

In the aspect of the invention, since the second reflection portion is configured as described above, the image light incident on the second reflection portion is diffused and reflected so that at least part of the diffused and reflected light is directed toward a region outside the preset field of view.

Therefore, appropriately setting the areas, positions, and other factors of the regions that undergo the diffusing process advantageously not only allows the decrease in brightness of a projected image within the preset field of view described above to be suppressed but also allows the projected image to be visually recognized even in a region outside the preset field of view.

BRIEF DESCRIPTION OF THE DRAWINGS

The invention will be described with reference to the accompanying drawings, wherein like numbers reference like elements.

FIG. 8 shows part of a projection surface in a second embodiment.

DESCRIPTION OF EXEMPLARY EMBODIMENTS

First Embodiment

Figure 1:
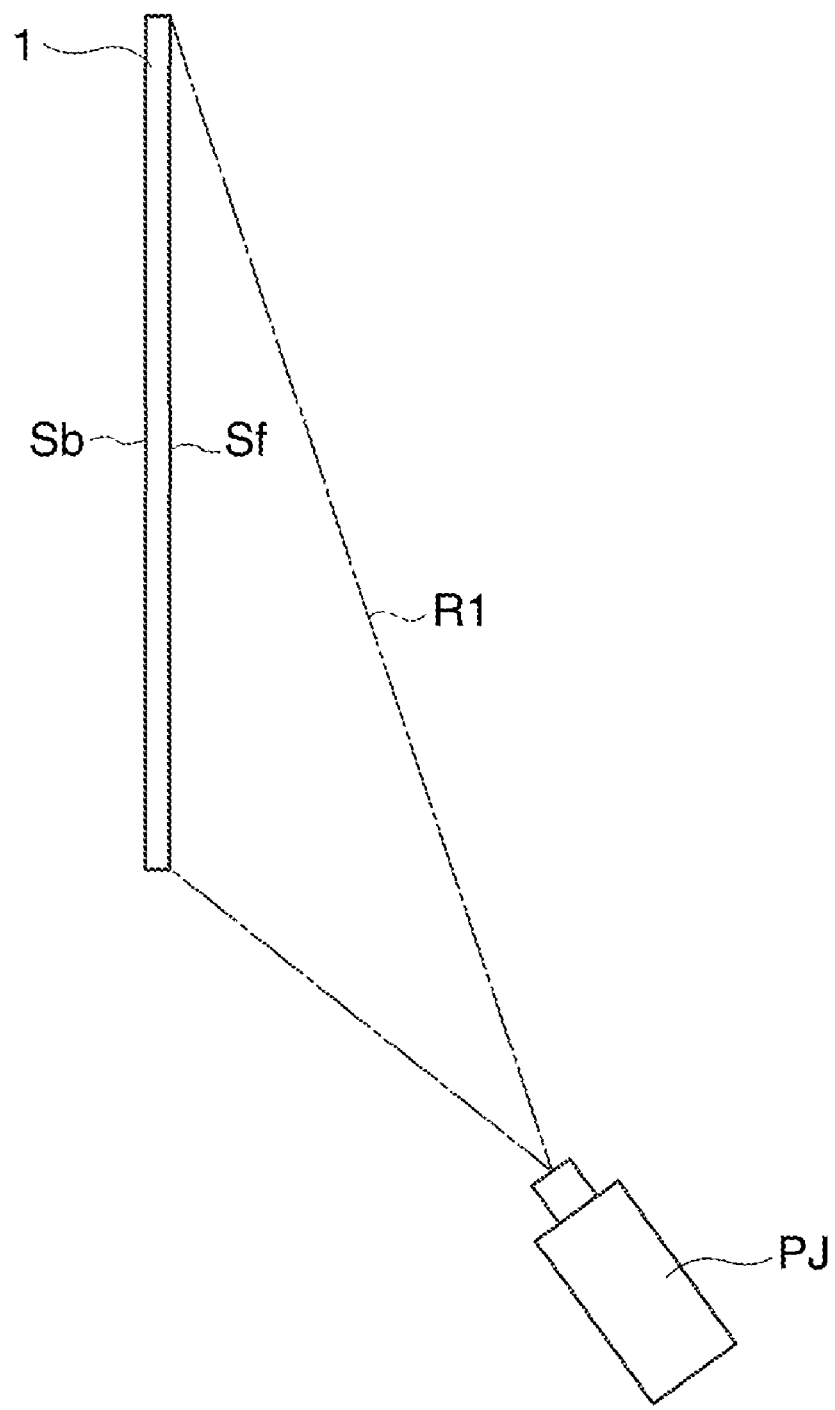
FIG. 1 diagrammatically shows a screen in use in a first embodiment.

A first embodiment of the invention will be described below with reference to the drawings.
Configuration of Screen FIG. 1 diagrammatically shows a screen 1 in use.

Figure 2:
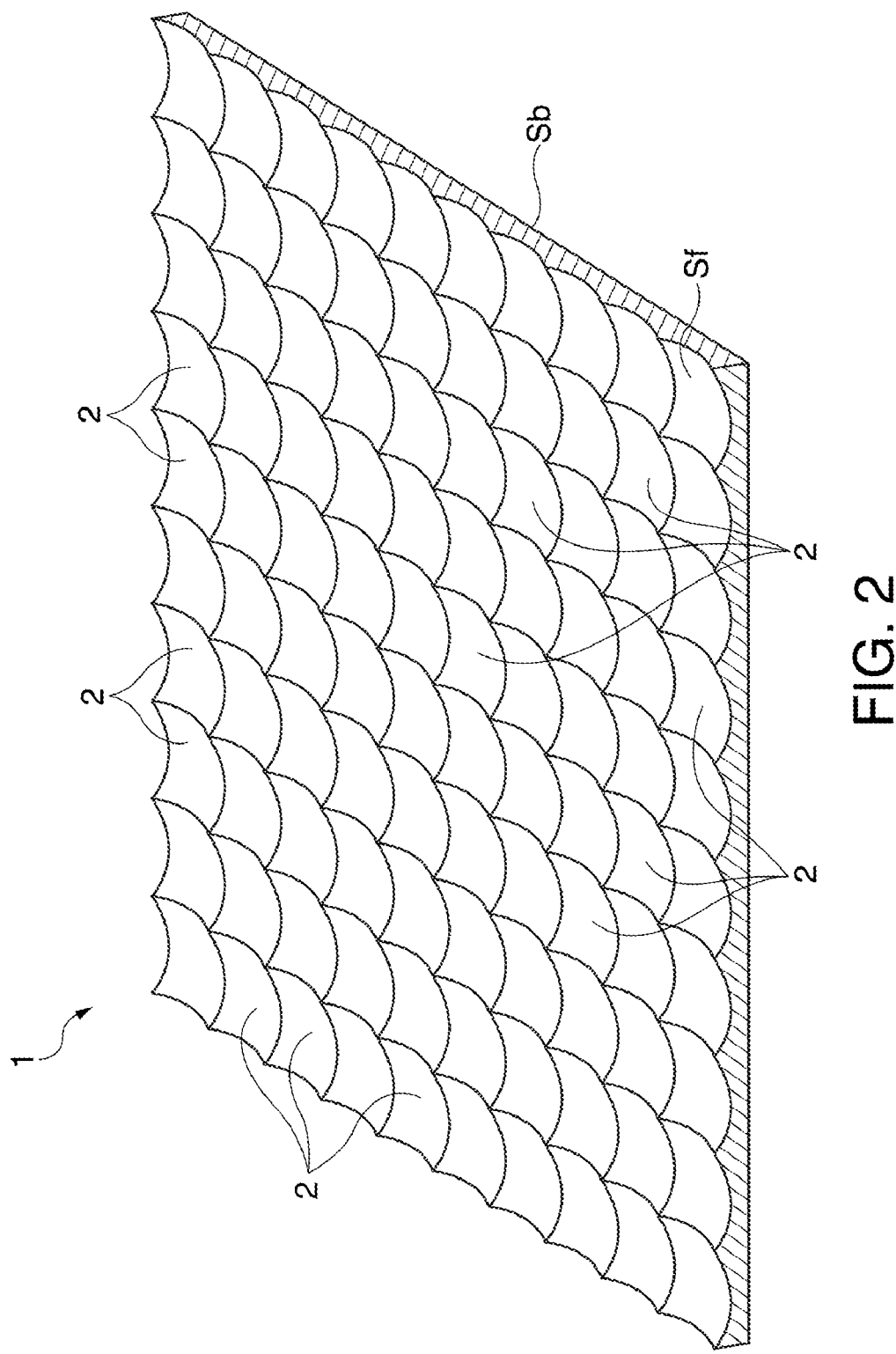
FIG. 2 shows part of a projection surface in the first embodiment.
Figure 3:
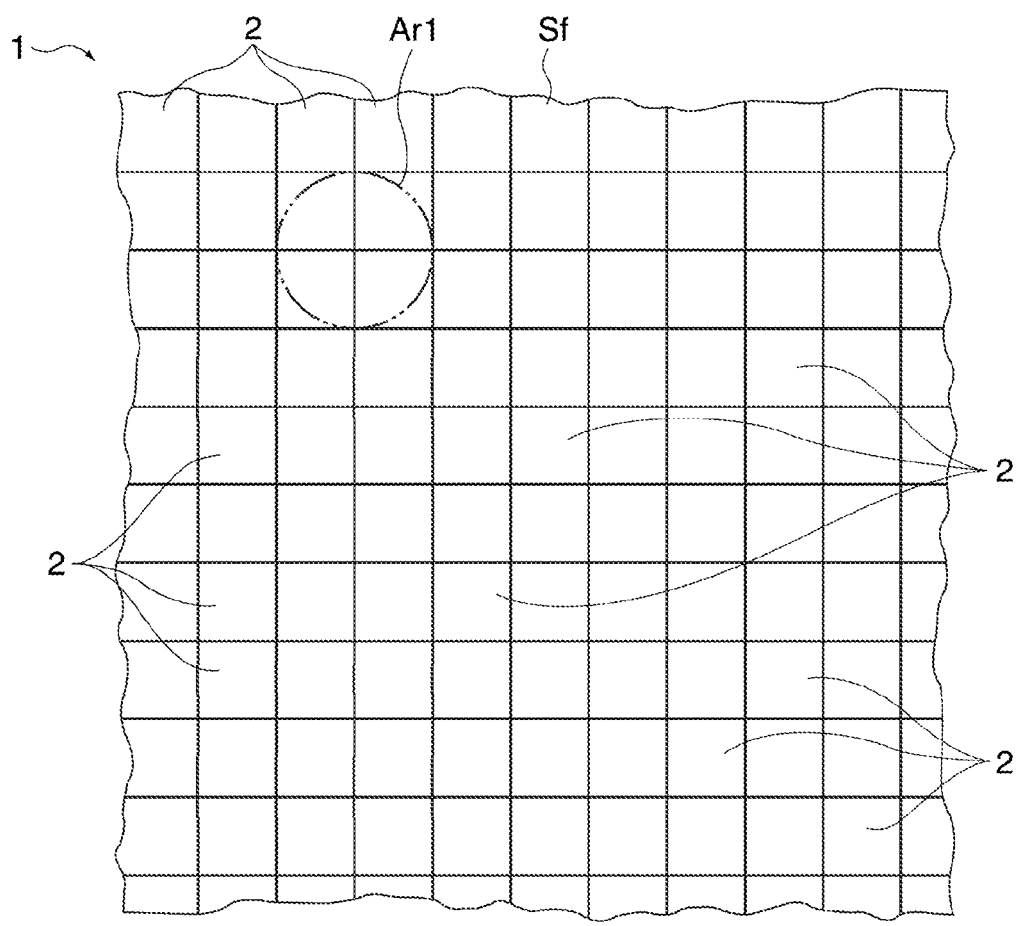
FIG. 3 shows part of the projection surface in the first embodiment.

FIGS. 2 and 3 show part of a projection surface Sf. Specifically, FIG. 2 is a perspective view, and FIG. 3 is a plan view. FIGS. 2 and 3 show a central region of the projection surface Sf that is in the vicinity of the center thereof in the right-left direction for ease of description.

In the following description, relevant directions in the screen 1 are defined as follows for ease of description: A "front side" is a side where a projector PJ is placed. A "rear side" is the side facing away from the front side. "Down" represents the direction in which gravity acts on the screen 1. "Up" represents the direction oriented away from "down." "Left" represents the left when viewed from the front. "Right" represents the direction oriented away from "left."

Further, reflection films 21 are omitted in FIGS. 2 and 3 for ease of illustration.

The screen 1 is a reflective screen having a substantially rectangular shape in a plan view and will be placed in a conference room, a school classroom, or any other bright room in such a way that a flat, rear end surface (hereinafter referred to as a rear surface Sb) is substantially parallel to a vertical line.

The screen 1 has a plurality of concavely curved unit structures 2 on a front end surface Sf (hereinafter referred to as the projection surface Sf), and each of the unit structures 2 forms part of a spherical surface (hereinafter referred to as a first spherical surface) and has a reflection portion 20 (see FIGS. 6A and 6B and FIGS. 7A and 7B) that reflects image light projected from the projector PJ.

Further, the arcuate length of each of the unit structures 2 in a cross-sectional view is set to be shorter than one-half the circumference of a circle obtained when the first spherical surface is taken along a plane including the diameter thereof.

In the bright room described above, the projector PJ is placed on a floor, a desk, or any other suitable object, as shown in FIG. 1.

In the present embodiment, although not specifically shown, the projector PJ is a proximity-projection projector including a projection optical apparatus that has a short focal length and projects image light R1 in a wide-angle mode and projecting the image light from a position proximate to the screen 1. Further, in the present embodiment, the projector PJ is placed in a position facing approximately the center in the right-left direction of the screen 1 when viewed in the direction along the vertical axis.

Configuration of Unit Structure

Although not specifically shown, the plurality of unit structures 2 are formed as follows.

That is, the plurality of unit structures 2 are arranged adjacent to each other along substantially concentric curved tracks around a reference point on an extension surface of the projection surface Sf. The reference point is positioned where the optical axis of the projection optical apparatus of the projector PJ intersects the extension surface.

The plurality of unit structures 2 are so formed that the spacing therebetween increases as the distance thereof from the reference point increases.

Among the plurality of unit structures 2, the unit structure 2 disposed in the vicinity of the center of the projection surface Sf in the right-left direction has a rectangular shape in a plan view, as shown in FIG. 2 or 3.

Further, the plurality of unit structures 2 are so formed that the shape thereof approaches a hexagonal shape from the rectangular shape in a plan view as the distance thereof from the center of the projection surface Sf in the right-left direction toward the right and left ends increases.

In each of the plurality of unit structures 2 described above, a reflection film 21 that reflects incident light (see FIGS. 6A and 6B or 7A and 7B) is formed in an upper region of the concavely curved surface.

Further, a light transmissive member 22 (see FIGS. 4, 6B, and 7B) is provided in a region Ar1 (region indicated by the chain double-dashed line in FIG. 3), which is part of the projection surface Sf.

Specifically, among the plurality of unit structures 2, second unit structures 2B (see FIGS. 4, 6B, and 7B) are filled with the light transmissive members 22.

Method for Manufacturing Screen

A method for manufacturing the screen 1 described above will next be described.

Figure 4:
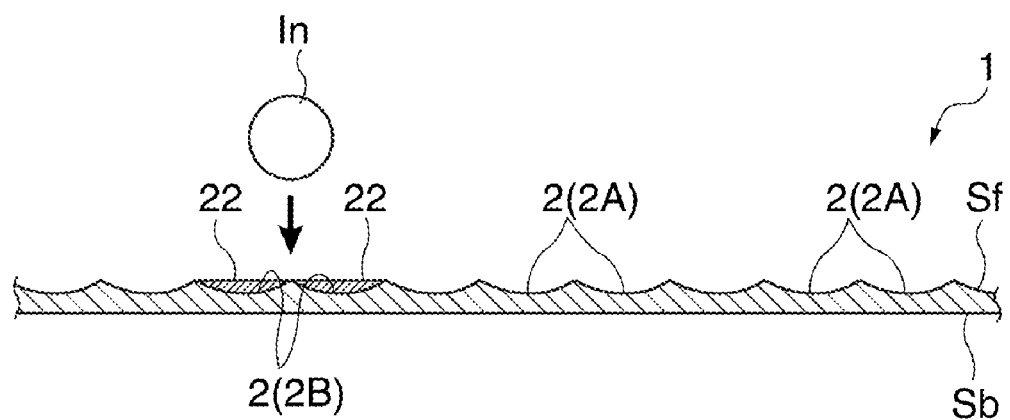
FIG. 4 describes a method for manufacturing the screen in the first embodiment.
Figure 5:
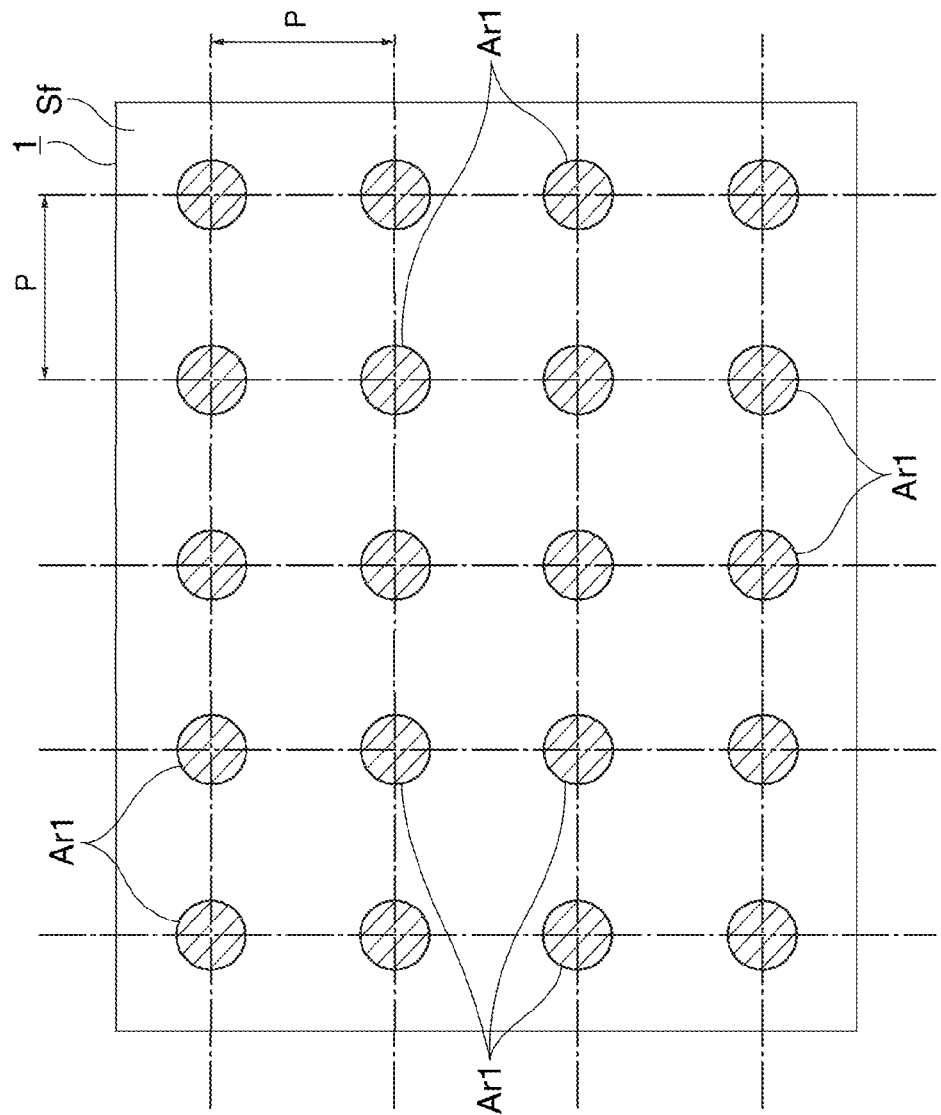
FIG. 5 describes the method for manufacturing the screen in the first embodiment.

FIGS. 4 and 5 describe the method for manufacturing the screen 1.

Specifically, FIG. 4 is a cross-sectional view for describing a method for forming the light transmissive members 22, and FIG. 5 is a plan view for describing how the light transmissive members 22 are formed and arranged.

First, a manufacturer manufactures a die (not shown) one side of which has protrusions and indentations (emboss pattern) corresponding to the protrusions and indentations of the projection surface Sf (plurality of unit structures 2) described above (die manufacturing step).

The manufacturer then uses the die described above to transfer the emboss pattern on the die to a resin sheet made of black vinyl chloride in an emboss process so that a plurality of concavely curved surfaces (unit structures 2) are formed (processing step).

The manufacturer then forms the reflection film 21 (see FIGS. 6A and 6B and 7A and 7B) in an upper region of each of the concavely curved surfaces in a vapor deposition, sputtering, or spray coating process (reflection film forming step).

The manufacturer then applies a transparent ink In, which will form the light transmissive members 22, onto the region Ar1, which is part of the projection surface Sf, by using an inkjet technique, as shown in FIG. 4 to form the light transmissive members 22 (light transmissive member forming step).

In the present embodiment, the region Ar1 is set as follows.

That is, a plurality of regions Ar1 are provided over the entire projection surface Sf in such a way that they are regularly arranged along row (up-down) and column (right-left) directions at predetermined spacings P, as shown in FIG. 5. The plurality of regions Ar1 are set so that the total area thereof is smaller than or equal to 10% of the total area of the plurality of unit structures 2 in a plan view.

The screen 1 is manufactured by carrying out the steps described above.

Reflection Structure of Screen

Figure 6A:
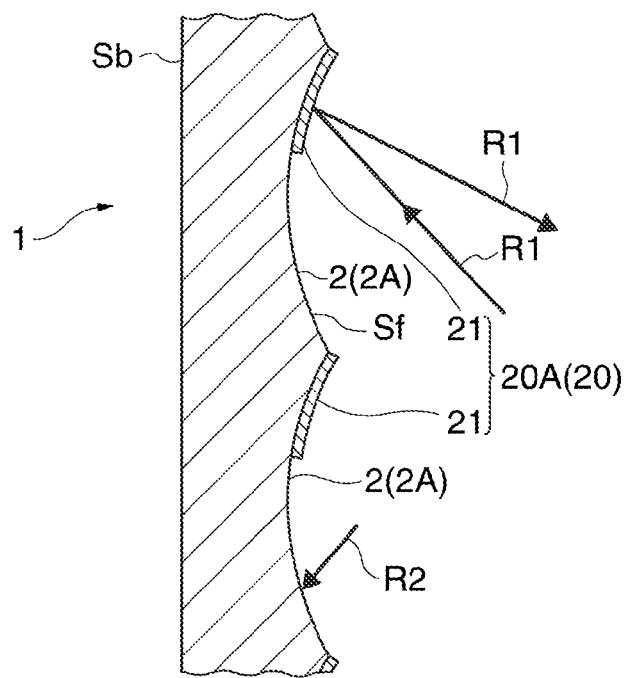
FIGS. 6A and 6B show the behavior of light incident on the screen in the first embodiment.
Figure 6B:
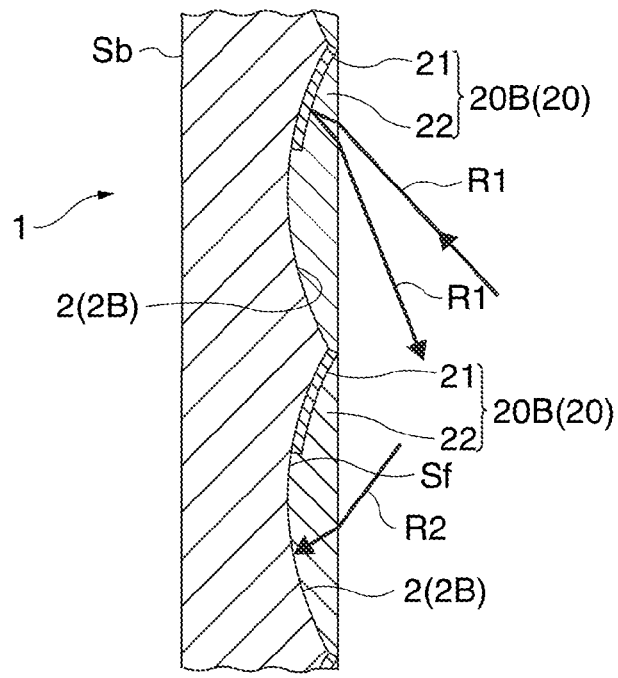
Figure 7A:
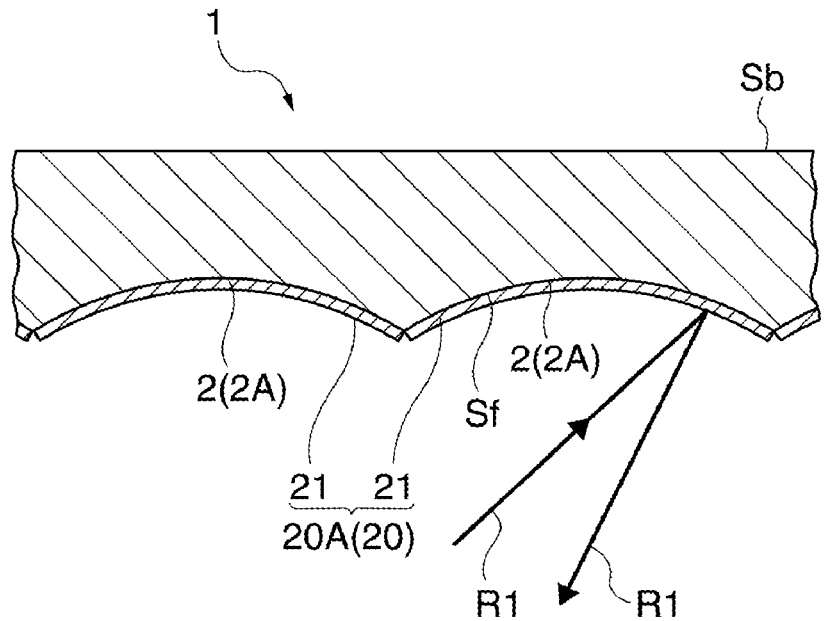
FIGS. 7A and 7B show the behavior of light incident on the screen in the first embodiment.
Figure 7B:
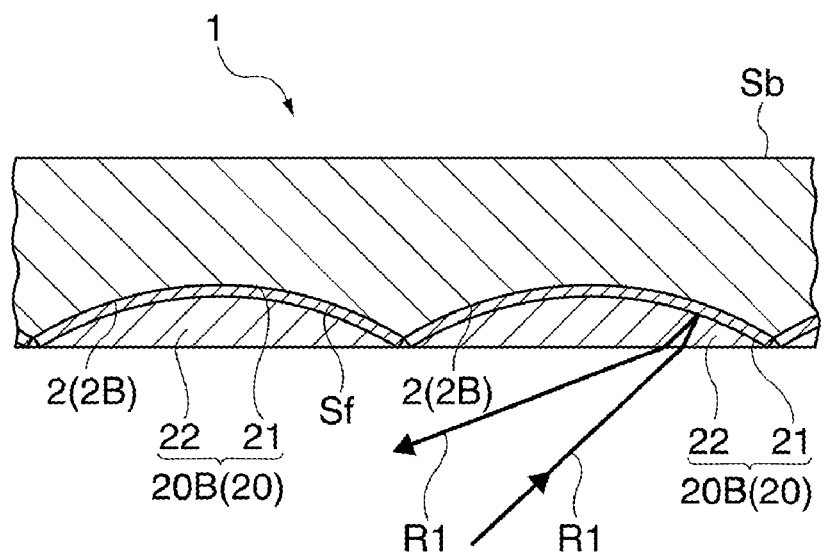

FIGS. 6A and 6B and FIGS. 7A and 7B show the behavior of light incident on the screen 1. Specifically, FIGS. 6A and 6B are longitudinal cross-sectional views of part of the screen 1 taken along a vertical plane and viewed in the direction along the horizontal axis, and FIGS. 7A and 7B are transverse cross-sectional views of part of the screen 1 (portions where the reflection films 21 are formed) taken along a horizontal plane and viewed in the direction along the vertical axis. FIGS. 6A and 7A show the behavior of light incident on the unit structures 2 where no light transmissive members 22 are formed (hereinafter referred to as first unit structures 2A), and FIGS. 6B and 7B show the behavior of light incident on the unit structures 2 where the light transmissive members 22 are formed (hereinafter referred to as second unit structures 2B). Further, the direction in which the image light R1 is incident is the same in FIGS. 6A and 6B, and this holds true in FIGS. 7A and 7B as well. FIGS. 7A and 7B show a case where the image light R1 is incident on the screen 1 from the front but obliquely rightward.

When viewed in the direction along the horizontal axis, the screen 1 reflects the image light R1 projected from the projector PJ and incident from the below (obliquely upward) on the screen 1 in the following manner.

That is, the first unit structure 2A reflects the image light R1 incident obliquely upward on the reflection film 21 primarily toward a preset region defined by a predetermined vertical viewing angle (angle between the central axis passing through the center of the screen 1 and perpendicular to the rear surface Sb thereof and a line inclined upward or downward thereto) (hereinafter referred to as a vertical field of view), as shown in FIG. 6A. As a result, a viewer within the vertical field of view recognizes the image light R1 reflected in the manner described above as a projected image.

On the other hand, the second unit structure 2B reflects the image light R1 incident obliquely upward primarily toward a region outside the vertical field of view, as shown in FIG. 6B.

Specifically, the image light R1 incident on the second unit structure 2B is refracted at the interface between an air layer and the light transmissive member 22, incident on the reflection film 21, reflected off the reflection film 21, refracted again at the interface between the air layer and the light transmissive member 22, whereby the light traveling direction is more inclined toward the rear surface Sb than the direction in which the image light R1 is reflected off the first unit structures 2A. As a result, the image light R1 incident on the second unit structures 2B is reflected primarily toward a region outside the vertical field of view. That is, a presenter standing close to the projection surface Sf and an audience in a region outside the vertical field of view both recognize the image light R1 reflected in the manner described above as a projected image.

The screen 1 is further illuminated by a fluorescent lamp or any other light source in the bright room and absorbs external light R2 incident from the above (obliquely downward), when viewed in the direction along the horizontal axis, on the unit structures 2A and 2B, as shown in FIGS. 6A and 6B.

Specifically, the screen 1 is manufactured based on a resin sheet made of black vinyl chloride, as described above. The external light R2, which is incident on the screen 1 obliquely downward, is primarily incident on the region where no reflection film 21 is formed (lower region of each of the concavely curved surfaces) in the unit structures 2A and 2B. As a result, the external light R2 incident on the screen 1 is primarily absorbed by the screen 1. Viewers within the vertical field of view and outside the vertical field of view will not recognize the external light R2 via the screen 1 but recognize a high-contrast projected image.

Similarly, when viewed in the direction along the vertical axis, the screen 1 reflects the image light R1 incident thereon in the following manner.

That is, the first unit structure 2A reflects the image light R1 incident on the reflection film 21 primarily toward a preset region defined by a predetermined horizontal viewing angle (angle between the central axis passing through the center of the screen 1 and perpendicular to the rear surface Sb thereof and a line inclined rightward or leftward thereto) (hereinafter referred to as a horizontal field of view), as shown in FIG. 7A. As a result, a viewer within the horizontal field of view recognizes the image light R1 reflected in the manner described above as a projected image.

On the other hand, the second unit structure 2B reflects the image light R1 incident on the light transmissive member 22 primarily toward a region outside the horizontal field of view with the aid of refraction at the interface between the air layer and the light transmissive member 22 in the same manner described above, as shown in FIG. 7B.

As described above, the reflection film 21 provided in one of the plurality of first unit structures 2A, which reflects the image light R1 primarily toward the preset field of view (vertical field of view and horizontal field of view), corresponds to a first reflection portion 20A (FIGS. 6A and 7A) according to the first embodiment of the invention.

Similarly, the light transmissive member 22 and the reflection film 21 provided in one of the plurality of second unit structures 2B, which reflect the image light R1 primarily toward a region outside the preset field of view (region outside vertical field of view and horizontal field of view), correspond to a second reflection portion 20B (FIGS. 6B and 7B) according to the first embodiment of the invention.

The first reflection portion 20A and the second reflection portion 20B correspond to the reflection portion 20, which reflect the image light R1, (FIGS. 6A and 6B and FIGS. 7A and 7B) according to the first embodiment of the invention.

The first embodiment described above provides the following advantageous effect.

In the present embodiment, the reflection portion 20 in one of the plurality of unit structures 2 includes the first reflection portion 20A and the second reflection portion 20B. That is, the image light R1 incident on the screen 1 is not only reflected off the first reflection portion 20A toward a preset field of view but also reflected off the second reflection portion 20B toward a region outside the preset field of view.

As a result, for example, even when a presenter who gives a presentation stands close to the projection surface Sf and looks at the projection surface Sf from a region outside the preset field of view, the presenter can recognize the image light R1 reflected off the second reflection portions 20B. Further, an audience in the region outside the preset field of view can also recognize the image light R1 reflected off the second reflection portions 20B.

The plurality of regions Ar1, each of which has the second reflection portion 20B provided therein, are set so that the total area thereof is smaller than or equal to 10% of the total area of the plurality of unit structures 2 in a plan view and provided over the entire projection surface Sf in such a way that they are regularly arranged along the row and column directions at the predetermined spacings P.

The configuration described above not only allows the luminance of the image light R1 reflected off the first reflection portions 20A to be maintained at a sufficiently high level, that is, decrease in brightness of a projected image within the preset field of view to be suppressed but also allows the image light R1 reflected off the second reflection portions 20B to be visually recognized as the projected image by the presenter and audience.

Further, the second reflection portion 20B reflects the incident image light R1 primarily toward a region outside the preset field of view with the aid of refraction of the image light R1 at the light transmissive member 22.

The screen 1 can therefore be readily manufactured because the second reflection portions 20B can be formed only by providing the light transmissive members 22 on the projection surface of a screen of related art.

Second Embodiment

A second embodiment of the invention will next be described with reference to the drawings.

In the following description, structures similar to those in the first embodiment and the same members as those in the first embodiment have the same reference characters, and detailed description of these structures and members will be omitted or simplified.

In the first embodiment described above, the second reflection portions 20B are formed by providing the light transmissive members 22 in the second unit structures 2B, which form part of the plurality of unit structures 2.

In contrast, the second reflection portions 20B are formed without the light transmissive members 22 in the second embodiment. The other configurations are similar to those in the first embodiment.

Figure 9:
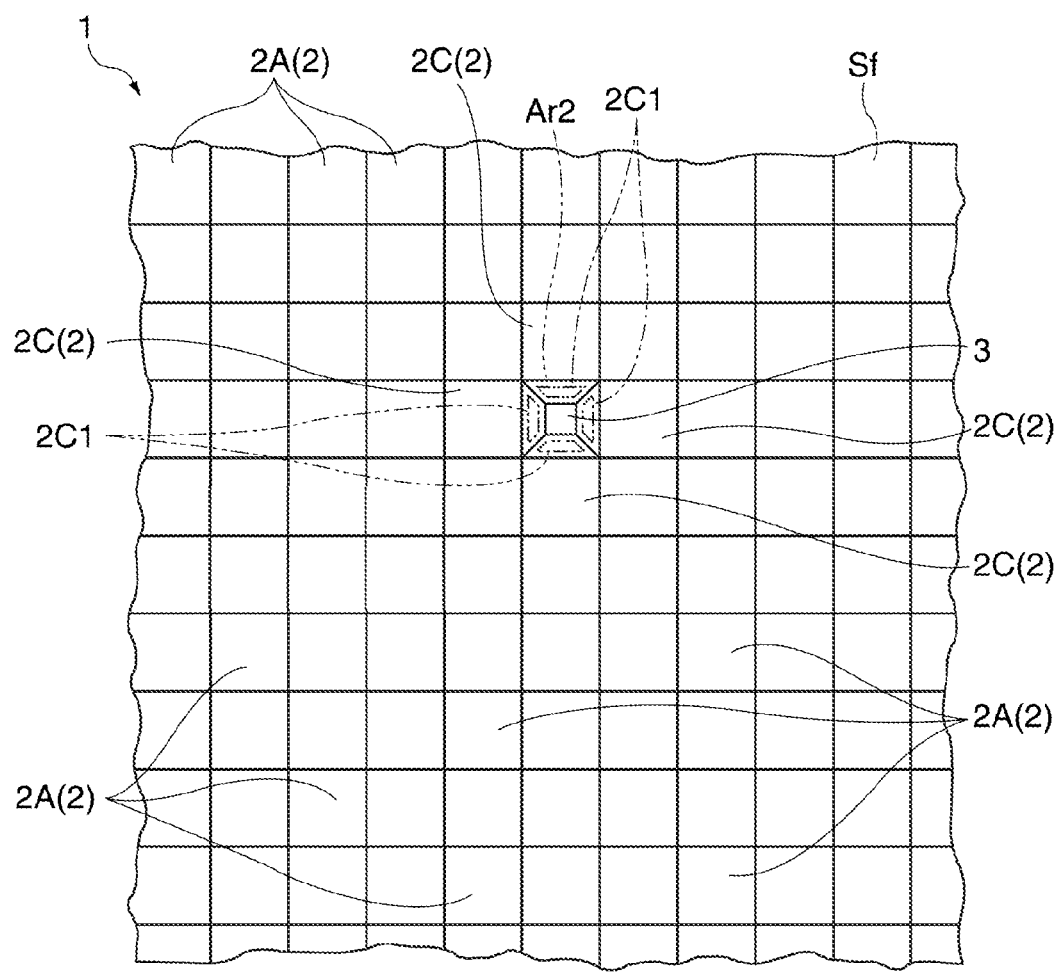
FIG. 9 shows part of the projection surface in the second embodiment.

FIGS. 8 and 9 show part of the projection surface Sf in the second embodiment. Specifically, FIG. 8 is a perspective view, and FIG. 9 is a plan view. FIGS. 8 and 9 show a central region of the projection surface Sf that is in the vicinity of the center thereof in the right-left direction for ease of description, as in FIGS. 2 and 3.

No unit structure 2 is formed in a region Ar2 (region indicated by the chain double-dashed lines in FIG. 9), which is part of the projection surface Sf of the screen 1 in the second embodiment, as shown in FIGS. 8 and 9.

The region Ar2 corresponds to one of the unit structures 2 in the present embodiment.

Among the plurality of unit structures 2, four unit structures 2 adjacent in the row and column directions to the region Ar2, which is part of the projection surface Sf, have extension surfaces 2C1 (regions indicated by the chain lines in FIGS. 8 and 9) whose arcuate length in a cross-sectional view is extended toward the region Ar2, as shown in FIGS. 8 and 9.

In the following description, the unit structure 2 having the extension surface 2C1 is referred to as a third unit structure 2C (FIGS. 8 and 9) for ease of description. Among the plurality of unit structures 2, the unit structure 2 other than the third unit structure 2C is referred to as first unit structure 2A (FIGS. 8 and 9) because they have the same structure as that of the first unit structure 2A described in the first embodiment.

In the region Ar2, the extension surfaces 2C1 of the four third unit structures 2C described above form a protrusion 3 protruding forward, as shown in FIGS. 8 and 9.

FIGS. 8 and 9 show only part of the projection surface Sf, but a plurality of protrusions 3 are provided over the entire projection surface Sf.

The front end of the protrusion 3 has a concavely curved shape that forms part of a spherical surface in a cross-sectional view (hereinafter referred to as a second spherical surface) and a substantially rectangular shape in a plan view, as in the case of the unit structure 2. Further, the arcuate length of the front end (concavely curved surface) of the protrusion 3 in a cross-sectional view is set to be shorter than one-half the circumference of a circle obtained when the second spherical surface is taken along a plane including the diameter thereof.

The first spherical surface described in the first embodiment and the second spherical surface may have the same radius or different radii.

The reflection film 21 is formed in an upper region of the concavely curved surface of each of the unit structures 2 (upper region of the concavely curved surface including the extension surface 2C1 in each of the third unit structures 2C) (see FIGS. 10A and 10B and FIGS. 11A and 11B), as in the first embodiment.

The reflection film 21 is formed also in an upper region of the concavely curved surface at the front end of the protrusions 3.

Figure 10A:
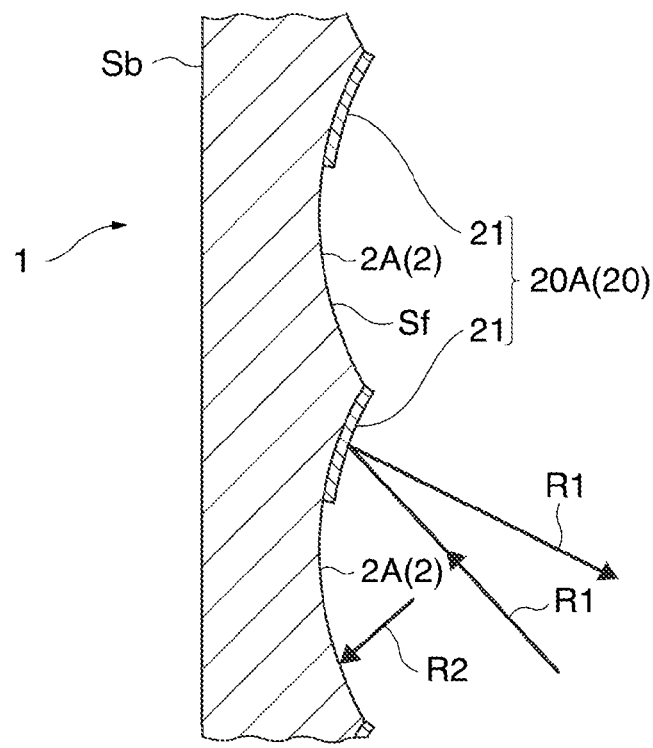
FIGS. 10A and 10B show the behavior of light incident on a screen in the second embodiment.
Figure 10B:
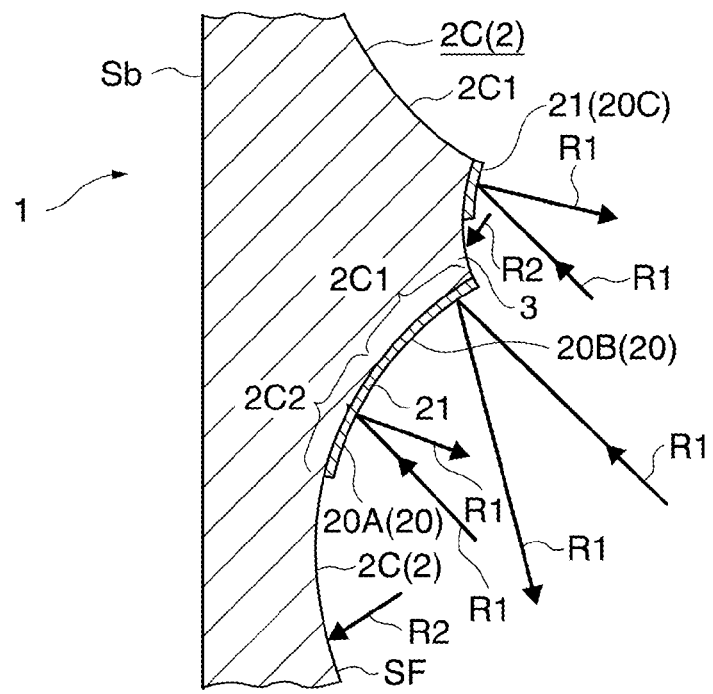
Figure 11A:
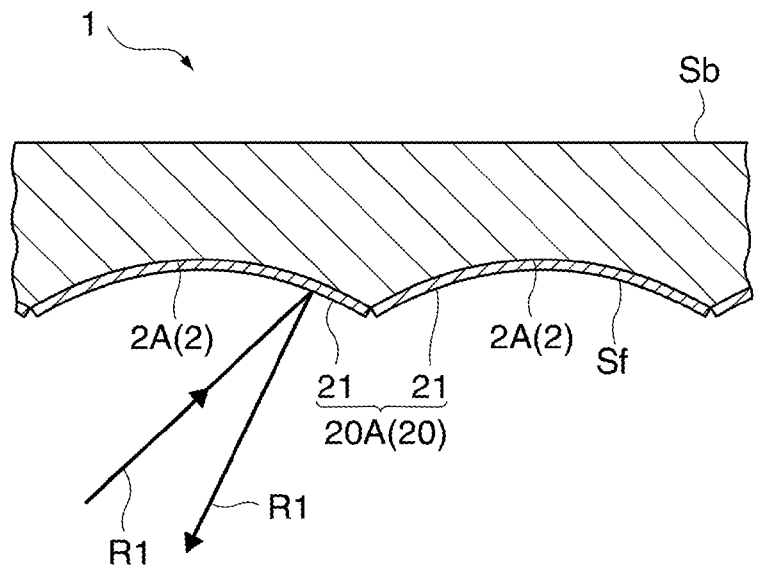
FIGS. 11A and 11B show the behavior of light incident on the screen in the second embodiment.
Figure 11B:
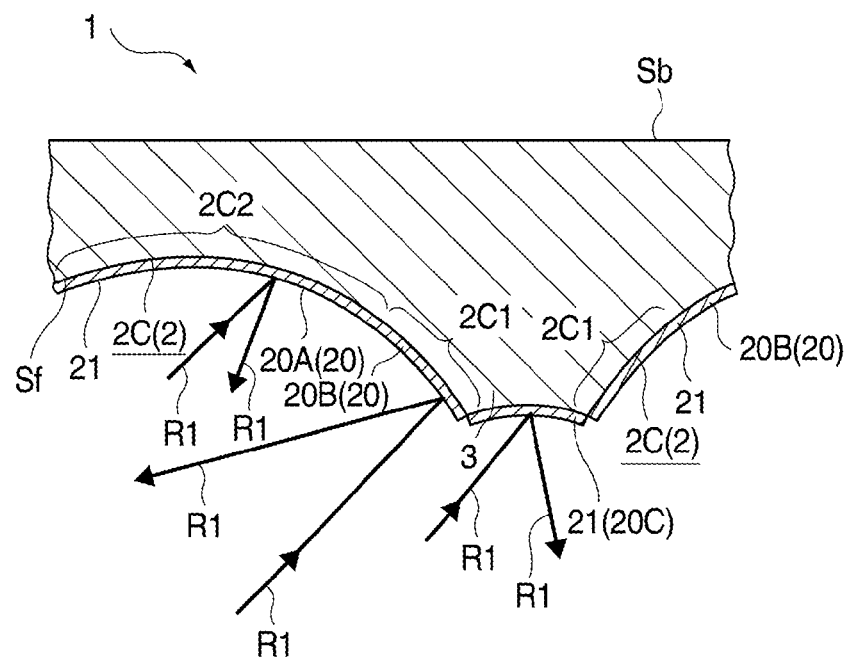

FIGS. 10A and 10B and FIGS. 11A and 11B show the behavior of light incident on the screen 1. Specifically, FIGS. 10A and 10B are longitudinal cross-sectional views of part of the screen 1 taken along a vertical plane and viewed in the direction along the horizontal axis, and FIGS. 11A and 11B are transverse cross-sectional views of part of the screen 1 (portions where the reflection films 21 are formed) taken along a horizontal plane and viewed in the direction along the vertical axis. FIGS. 10A and 11A show the behavior of light incident on the first unit structures 2A, and FIGS. 10B and 11B show the behavior of light incident on the third unit structures 2C. Further, the direction in which the image light R1 is incident is the same in FIGS. 10A and 10B, and this holds true in FIGS. 11A and 11B as well. FIGS. 11A and 11B show a case where the image light R1 is incident on the screen 1 from the front but obliquely rightward.

The behavior of the image light R1 and the external light R2 incident on the first unit structures 2A is the same as that in the first embodiment described above (FIGS. 6A and 7A), as shown in FIGS. 10A and 11A.

The behavior of the external light R2 incident on the third unit structures 2C is the same as that of the external light R2 incident on the first unit structures 2A, as shown in FIG. 10B.

In consideration of the above, only the behavior of the image light R1 incident on the third unit structure 2C and the behavior of the image light R1 incident on the front end of the protrusion 3 will be described in the following description.

The third unit structure 2C reflects the image light R1 incident on a surface 2C2, which is part of the reflection film 21 on the surface other than the extension surface 2C1, primarily toward a preset field of view (vertical field of view and horizontal field of view), as shown in FIG. 10B or 11B, as in the case of the first unit structures 2A.

On the other hand, the third unit structure 2C reflects the image light R1 incident on the extension surface 2C1 (reflection film 21) primarily toward a region outside the preset field of view (region outside vertical field of view and horizontal field of view), as shown in FIG. 10B or 11B.

Specifically, when the angle of incidence of the image light R1 incident on the extension surfaces 2C1 is compared with the angle of incidence of the image light R1 incident on the other surfaces 2C2, the angle of incidence of the image light R1 incident on the extension surfaces 2C1 is larger. As a result, the image light R1 incident on the extension surfaces 2C1 (reflection films 21) is reflected in such a way that the light traveling direction is more inclined toward the rear surface Sb than the direction in which the image light R1 is reflected off the other surfaces 2C2 (reflection films 21). The image light R1 incident on the extension surfaces 2C1 (reflection films 21) is therefore reflected primarily toward a region outside the preset field of view (region outside vertical field of view and horizontal field of view).

The image light R1 incident on the front end of the protrusion 3 is reflected off the reflection film 21 formed in an upper region of the concavely curved surface primarily toward the preset field of view (vertical field of view and horizontal field of view), as shown in FIG. 10B or 11B, as in the case of the first unit structures 2A.

On the other hand, the external light R2 incident obliquely downward on the front end of the protrusion 3 is absorbed by the region where no reflection film 21 is formed, as shown in FIG. 10B, as in the case of the unit structures 2.

As described above, the reflection film 21 in one of the plurality of first unit structures 2A and the reflection film 21 on the other surface 2C2 of one of the plurality of third unit structures 2C, which reflect the image light R1 primarily toward the preset field of view (vertical field of view and horizontal field of view), correspond to a first reflection portion 20A (FIGS. 10A and 10B and FIGS. 11A and 11B) according to the second embodiment of the invention.

The reflection film 21 on the extension surface 2C1 of one of the plurality of third unit structures 2C, which reflects the image light R1 primarily toward a region outside the preset field of view (region outside vertical field of view and horizontal field of view), corresponds to a second reflection portion 20B (FIGS. 10B and 11B) according to the second embodiment of the invention.

Further, the reflection film 21 on the front end of one of the plurality of protrusions 3, which reflects the image light R1 primarily toward the preset field of view (vertical field of view and horizontal field of view), corresponds to a third reflection portion 20C (FIGS. 10B and 11B) according to the second embodiment of the invention.

A method for manufacturing the screen 1 in the second embodiment will next be described.

Figure 12A:
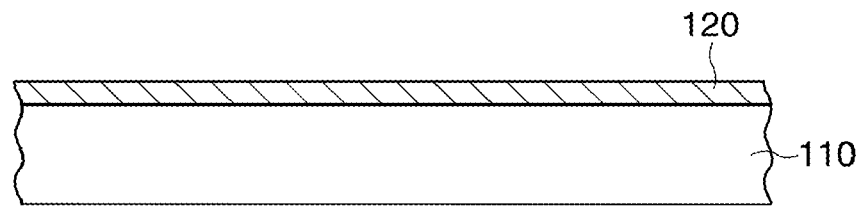
FIGS. 12A to 12E describe a method for manufacturing the screen in the second embodiment.
Figure 12B:
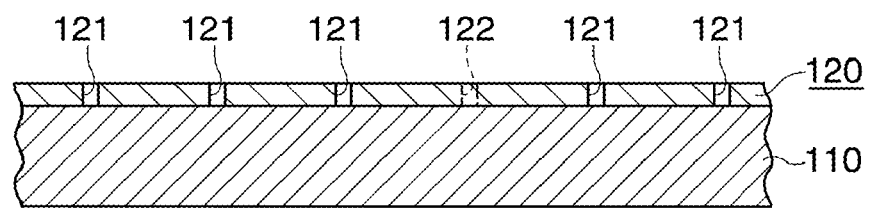
Figure 12C:
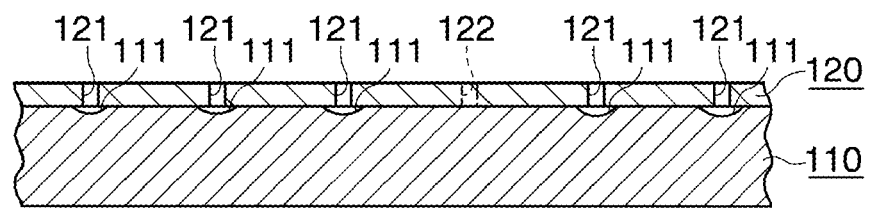
Figure 12D:
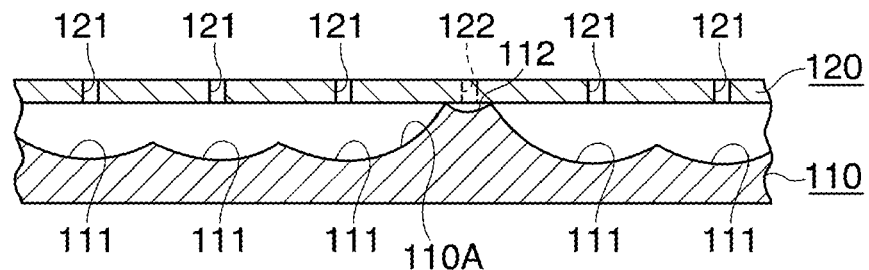
Figure 12E:
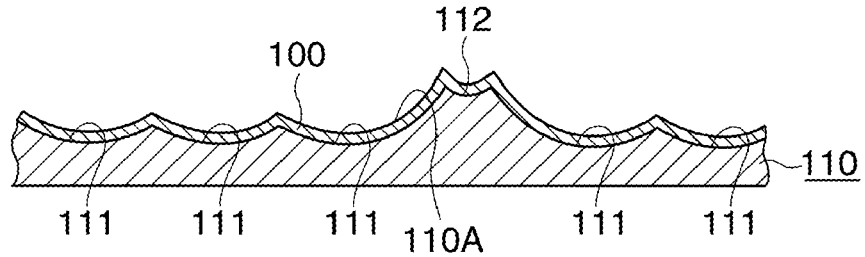
Figure 13:
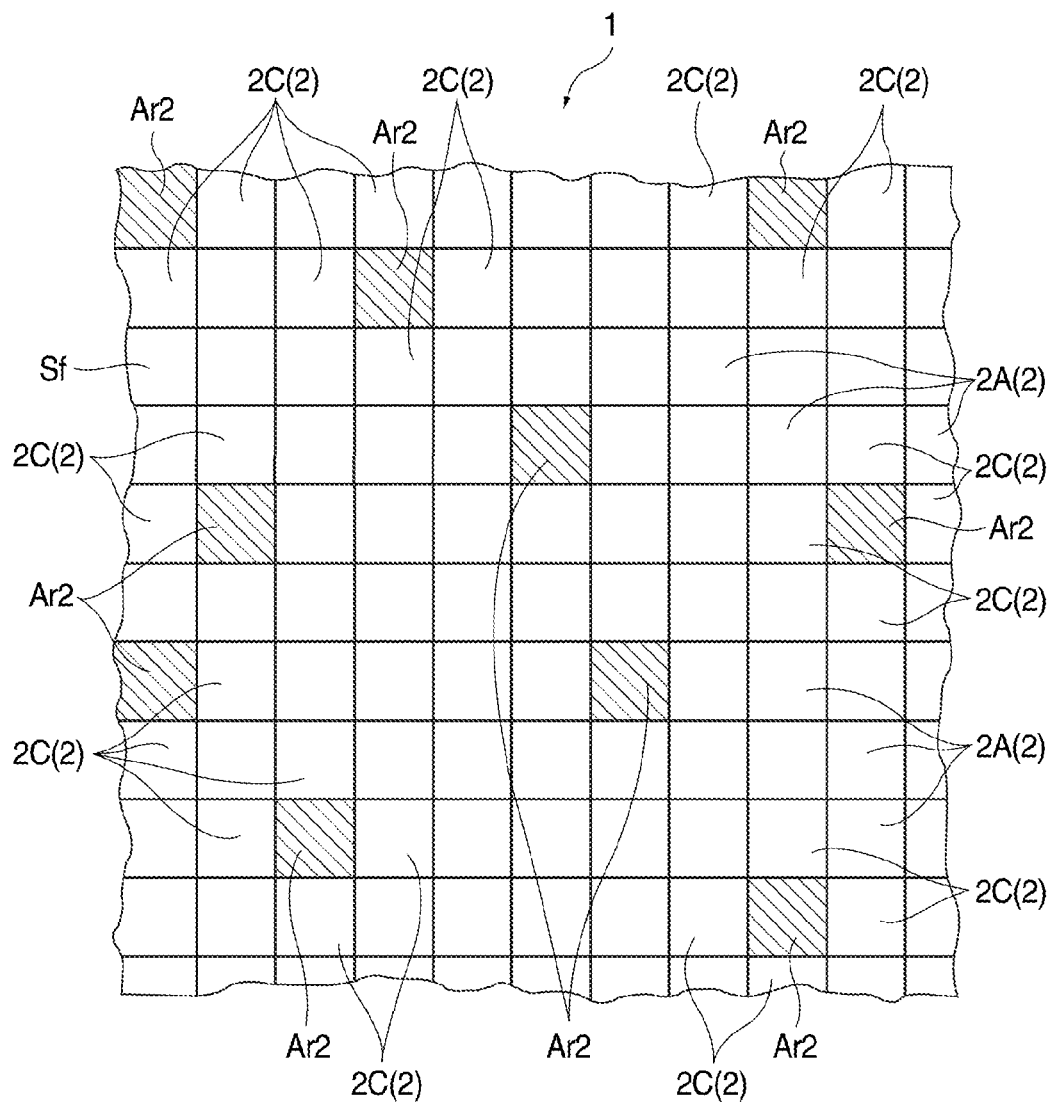
FIG. 13 describes the method for manufacturing the screen in the second embodiment.

FIGS. 12A to 12E and 13 describe the method for manufacturing the screen 1. Specifically, FIGS. 12A to 12E describe a method for manufacturing a die 100 one side of which has protrusions and indentations (emboss pattern) corresponding to the protrusions and indentations of the projection surface Sf (plurality of unit structures 2 and protrusions 3) described above. FIG. 13 is a plan view for describing how the regions Ar2 are arranged and showing a central region of the projection surface Sf that is in the vicinity of the center thereof in the right-left direction for ease of description, as in FIGS. 2 and 3.

In the following description, the method for manufacturing the die 100 will first be described with reference to FIGS. 12A to 12E before the method for manufacturing the screen 1 is described.

A manufacturer first forms a mask film 120, such as a chromium film, on one side of a master plate 110 having substantially the same plan shape as that of the screen 1 by using vapor deposition, sputtering, or any other suitable technique, as shown in FIG. 12A (mask film forming step).

The manufacturer then successively forms first circular holes 121, for example, by applying laser light to the mask film 120 in the positions corresponding to the vertices of the plurality of unit structures 2A and 2C (concavely curved surfaces), as shown in FIG. 12B (first hole formation step).

That is, when the first circular holes 121 are successively formed in the first hole forming step, no first circular hole 121 is formed (indicated by the chain lines in FIG. 12B) in the positions corresponding to the regions Ar2 of the projection surface Sf.

The manufacturer then forms first recesses 111 in an etching process in the positions corresponding to the first circular holes 121 in the master plate 110, as shown in FIG. 12C (first etching step).

Each of the first recesses 111 formed in the etching process has a concavely curved surface that forms part of a spherical surface and all the first recesses 111 have substantially the same shape because the first circular holes 121 have substantially the same shape.

The manufacturer then successively forms second circular holes 122 having the same shape as that of the first circular holes 121, for example, by applying laser light in the positions corresponding to the regions Ar2 of the projection surface Sf, as shown in FIG. 12D (second hole forming step).

The manufacturer then performs second etching to form second recesses 112 in the positions corresponding to the second circular holes 122 in the base plate 110, as shown in FIG. 12D (second etching step).

In this process, each of the second recesses 112 formed by the second etching process has a concavely curved surface that forms part of a spherical surface, as in the case of the first recesses 111 described above.

The first recesses 111 that undergo the second etching will be etched deeper than in the first etching (FIG. 12C), as shown in FIG. 12D. That is, the first recesses 111 are formed to be larger than the second recesses 112 by the amount corresponding to the first etching and hence have curvature different from that of the concavely curved surfaces of the second recesses 112 (curvature smaller than that of the second recesses 112).

The second recesses 112 correspond to the front ends of the protrusions 3. The first recesses 111 adjacent to the second recesses 112 correspond to the third unit structures 2C.

The manufacturer then removes the mask film 120 from the master plate 110 and uses a processed surface 110A of the master plate 110 on which the recesses 111 and 112 have been formed (surface having a shape corresponding to the protrusions and indentations of the projection surface Sf) to form the die 100 (die forming step).

Specifically, the manufacturer immerses the processed surface 110A in an electrolyte made of a metal salt so that the metal salt is deposited on the processed surface 110A in an electrolysis process, as shown in FIG. 12E, and the deposited metal layer is then separated from the processed surface 110A. The die 100 having an emboss pattern having the transferred protrusions and indentations of the processed surface 110A is thus formed.

After the die 100 has been manufactured as described above, the manufacturer transfers the emboss pattern on the die 100 to a resin sheet made of black vinyl chloride in an emboss process to form a plurality of concavely curved surfaces (unit structures 2A and 2C) and protrusions 3 (processing step). The manufacturer then forms the reflection film 21 in a predetermined region of the concavely curved surface in each of the unit structures 2A and 2C and in a predetermined region of the concavely curved surface at the front end of each of the protrusions 3 in a vapor evaporation, sputtering, or spray coating process (reflection film forming step).

In the present embodiment, the regions Ar2 are set as follows.

That is, the regions Ar2 are provided in a plurality of locations over the entire projection surface Sf in such a way that they are arranged in a random manner, as shown in FIG. 13. The plurality of regions Ar2 are set so that the total area thereof in a plan view is smaller than or equal to 10% of the total region (area) where the plurality of unit structures 2A and 2C and the plurality of protrusions 3 are formed.

The screen 1 is manufactured by carrying out the steps described above.

In the second embodiment described above, the second reflection portion 20B is provided on the extension surface 2C1 of the third unit structure 2C. That is, the image light R1 is incident on the extension surface 2C1 (second reflection portion 20B) at a relatively large angle of incidence. As a result, the second reflection portion 20B reflects the incident image light R1 at a relatively large angle of reflection, that is, reflects the incident image light R1 toward a region outside the preset field of view.

Further, the plurality of regions Ar2, each of which forms the second reflection portions 20B, are set so that the total area thereof in a plan view is smaller than or equal to 10% of the total region (area) where the plurality of unit structures 2A and 2C and the plurality of protrusions 3 are formed and provided over the entire projection surface Sf in such a way that they are arranged in a random manner.

As a result, the second embodiment advantageously allows a projected image to be visually recognized even from a region outside the preset field of view, while decrease in brightness of the projected image within the preset field of view is to be suppressed, as in the first embodiment described above.

Further, the front end of the protrusion 3 provided on the projection surface Sf is formed of a concavely curved surface. The third reflection portion 20C, which reflects the incident image light R1 toward the region within the preset field of view, is provided in an upper region of the concavely curved surface.

The front end of each of the protrusions 3 (third reflection portion 20C) can therefore function in the same manner as the first reflection portion 20A does, whereby decrease in brightness of a projected image within the preset field of view can be effectively suppressed.

Third Embodiment

A third embodiment of the invention will next be described with reference to the drawings.

In the following description, structures similar to those in the second embodiment and the same members as those in the second embodiment have the same reference characters, and detailed description of these structures and members will be omitted or simplified.

Figure 14A:
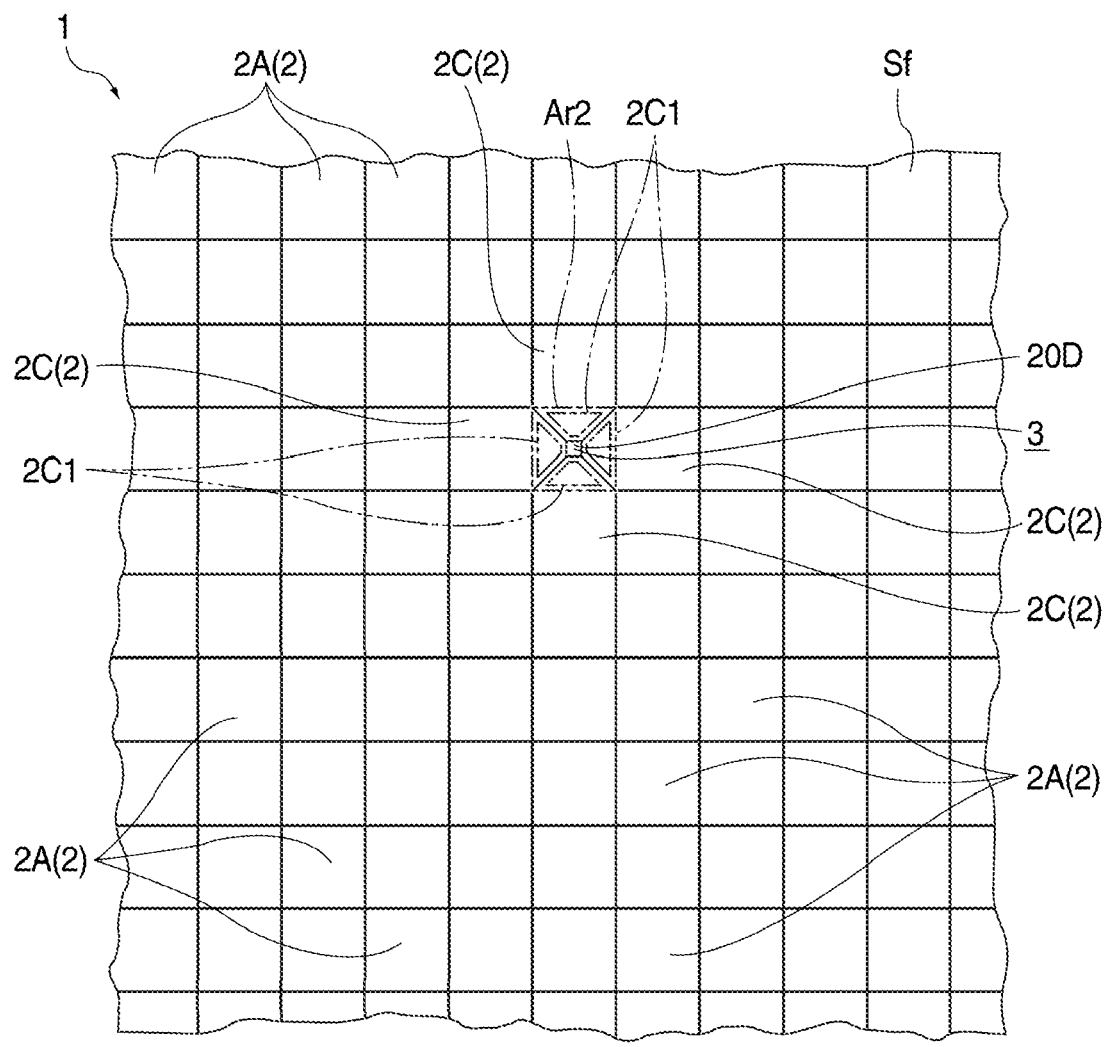
FIGS. 14A and 14B show part of a projection surface in a third embodiment.
Figure 14B:
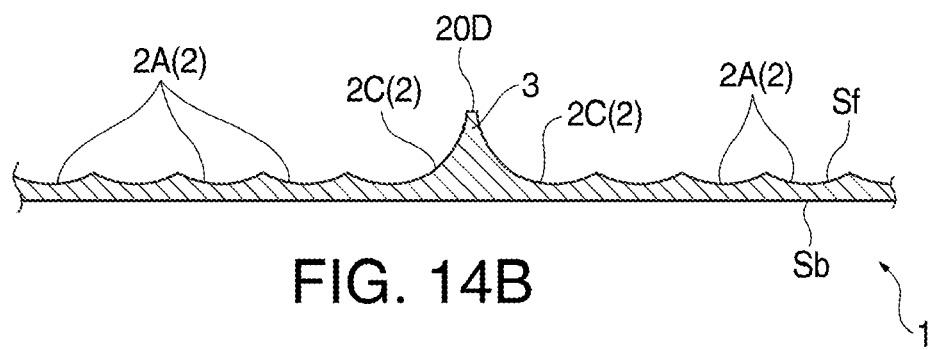

FIGS. 14A and 14B show part of the projection surface Sf in the third embodiment. Specifically, FIG. 14A is a plan view, and FIG. 14B is a cross-sectional view. FIGS. 14A and 14B show a central region of the projection surface Sf that is in the vicinity of the center thereof in the right-left direction for ease of description, as in FIG. 9.

The third embodiment only differs from the second embodiment in terms of the method for manufacturing the screen 1 (method for manufacturing the die 100).

Specifically, the method for manufacturing the die 100 in the third embodiment differs from that in the second embodiment in that the etching time in the first etching step is increased and the second hole forming step and the second etching step are omitted.

That is, the die 100 in the third embodiment has no second recess 112 formed in the master plate 110.

As a result, when the emboss pattern on the die 100 is transferred in an emboss process, a flat front end of the protrusions 3 is formed, as shown in FIG. 14B.

Further, a reflection film (not shown) is formed on the front end of the protrusion 3.

The image light R1 incident on the front end of the protrusion 3 is reflected off the flat front end primarily toward a region outside the preset field of view (region outside vertical field of view and horizontal field of view).

The front end (reflection film) of the protrusion 3 therefore corresponds to a fourth reflection portion 20D (FIGS. 14A and 14B) according to the third embodiment of the invention.

The third embodiment described above provides not only the same advantageous effect as that provided in the second embodiment described above but also the following advantageous effect.

In the present embodiment, the front end of the protrusion 3 provided on the projection surface Sf has a flat surface, on which the fourth reflection portion 20D, which reflects the incident image light R1 primarily toward a region outside the preset field of view, is provided.

As a result, the front end (fourth reflection portion 20D) of the protrusion 3 can be used to improve the brightness of a projected image outside the preset field of view.

Fourth Embodiment

A fourth embodiment of the invention will next be described with reference to the drawings.

In the following description, structures similar to those in the first embodiment and the same members as those in the first embodiment have the same reference characters, and detailed description of these structures and members will be omitted or simplified.

In the first embodiment described above, the second reflection portions 20B are formed by providing the light transmissive members 22 in the second unit structures 2B, which form part of the plurality of unit structures 2.

In contrast, the second reflection portions 20B are formed in the fourth embodiment by using a method which differs from that used in the first embodiment and in which no light transmissive members 22 are provided. The other configurations are the same as those in the first embodiment.

Figure 15A:
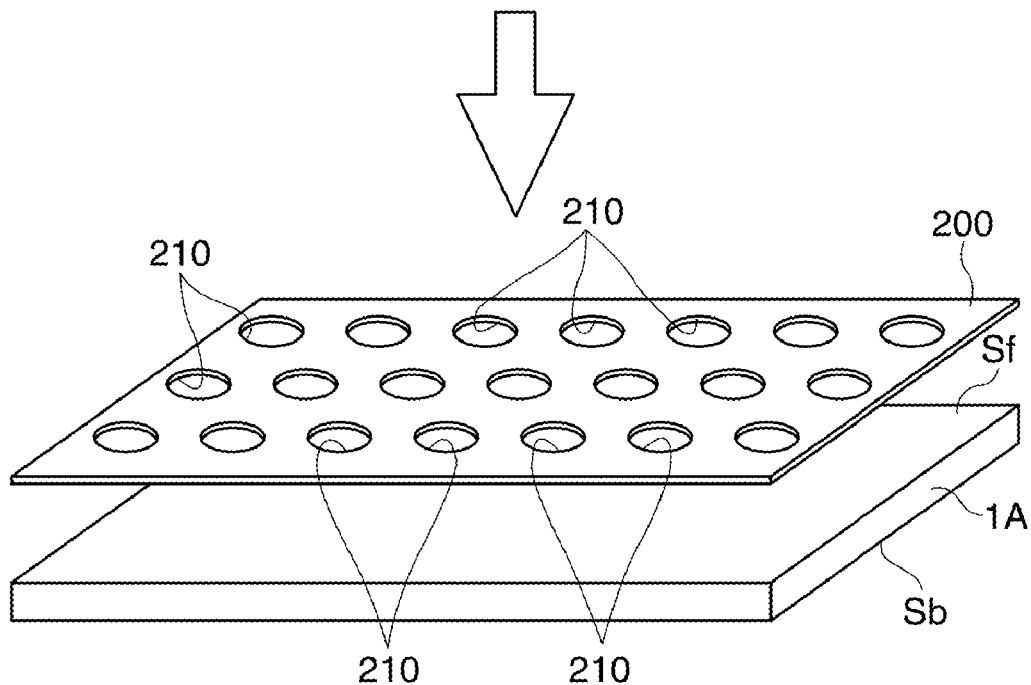
FIGS. 15A and 15B describe a method for manufacturing a screen in a fourth embodiment.
Figure 15B:
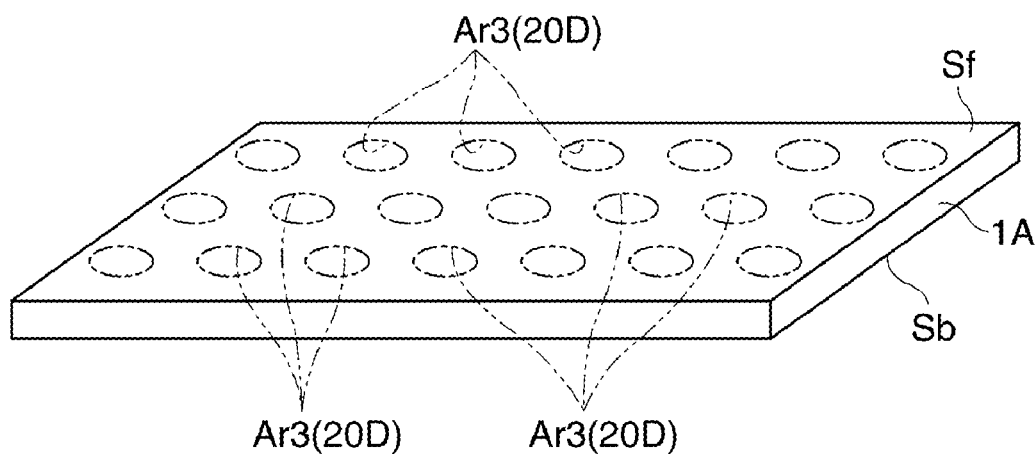

FIGS. 15A and 15B describe a method for manufacturing the screen 1 in the fourth embodiment.

Figure 16A:
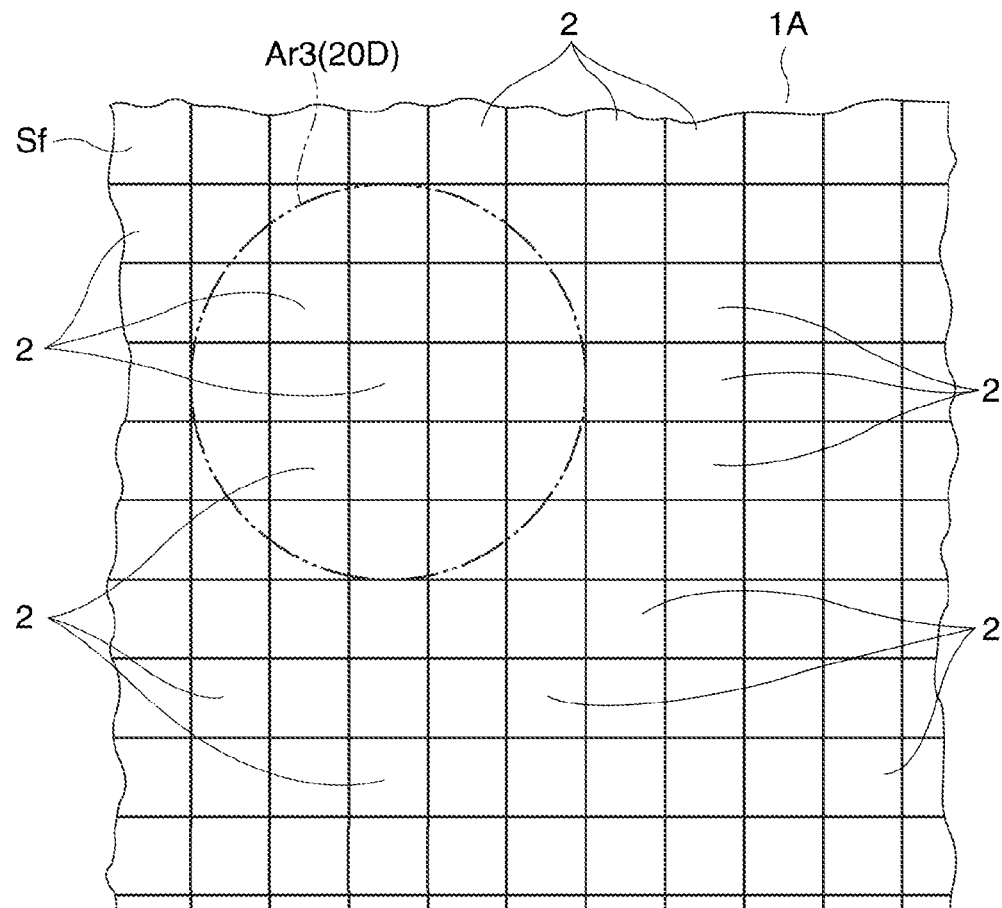
FIGS. 16A and 16B show part of a projection surface in the fourth embodiment.
Figure 16B:
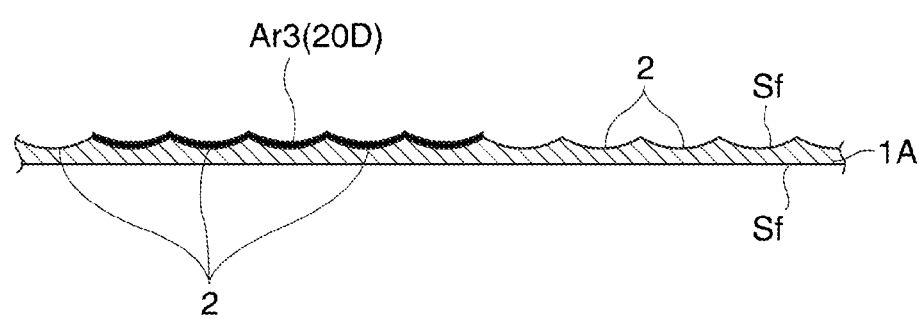

FIGS. 16A and 16B show part of the projection surface Sf. Specifically, FIG. 16A is a plan view, and FIG. 16B is a cross-sectional view. FIGS. 16A and 16B show a central region of the projection surface Sf that is in the vicinity of the center thereof in the right-left direction for ease of description, as in FIGS. 2 and 3.

An emboss pattern on a die is transferred onto a resin sheet 1A made of black vinyl chloride (FIGS. 15A and 15B and FIGS. 16A and 16B) in an emboss process so that a plurality of concavely curved surfaces (unit structures 2) are formed by carrying out the die manufacturing step and the processing step described in the first embodiment.

A manufacturer then places a mask member 200 on the projection surface Sf on which the plurality of concavely curved surfaces (unit structures 2) have been formed, as shown in FIG. 15A.

The mask member 200 has substantially the same plan shape as that of the resin sheet 1A (screen 1). The mask member 200 has a plurality of circular openings 210 formed therein, as shown in FIG. 15A.

The manufacturer then performs a blast process on the mask member 200 (blasting step).

In the blasting step, blast particles impinge on the projection surface Sf in regions Ar3 (regions indicated by the chain double-dashed lines in FIGS. 15B and 16A and regions indicated by the thick line in FIG. 16B) corresponding to the plurality of circular openings 210 through the plurality of circular openings 210, whereby the regions Ar3 are roughened.

The manufacturer then performs the reflection film forming step described in the first embodiment to manufacture the screen 1.

In the present embodiment, the plurality of circular openings 210 (regions Ar3) are set as follows.

That is, the plurality of circular openings 210 (regions Ar3) are provided over the entire mask member 200 in such a way that they are regularly arranged in the row and column directions at predetermined spacings, as shown in FIGS. 15A and 15B. The plurality of circular openings 210 (regions Ar3) are set so that the total area thereof is smaller than or equal to 10% of the total area of the plurality of unit structures 2 in a plan view.

The screen 1 is manufactured by carrying out the steps described above.

In the screen 1, since the regions Ar3 (reflection films) have been roughened in the manufacturing method described above, the incident image light R1 is reflected and diffused. The regions Ar3 therefore reflect the image light R1 primarily toward a region outside a preset field of view (region outside vertical field of view and horizontal field of view).

That is, the region Ar3 (reflection films) corresponds to a fourth reflection portion 20D (FIG. 15B and FIGS. 16A and 16B) according to the fourth embodiment of the invention.

The region other than the regions Ar3 (reflection films (not shown)) reflects the incident image light R1 in the same manner as the reflection films 21 in the first unit structures 2A described in the first embodiment do.

In the fourth embodiment described above, the second reflection portions 20B, which have undergone the blast process, diffuse and reflect the incident image light R1 primarily toward a region outside the preset field of view.

The plurality of regions Ar3, where the second reflection portions 20B are provided, are set so that the total area thereof is smaller than or equal to 10% of the total area of the plurality of unit structures 2 in a plan view and provided over the entire projection surface Sf in such a way that they are regularly arranged in the row and column directions at predetermined spacings.

As a result, the fourth embodiment advantageously allows a projected image to be visually recognized even from a region outside the preset field of view, while decrease in brightness of the projected image within the preset field of view is to be suppressed, as in the first embodiment described above.

The invention is not limited to the embodiments described above but encompasses variations, modifications, and other changes thereof to the extent that they can achieve the advantage of the invention.

Figure 17:
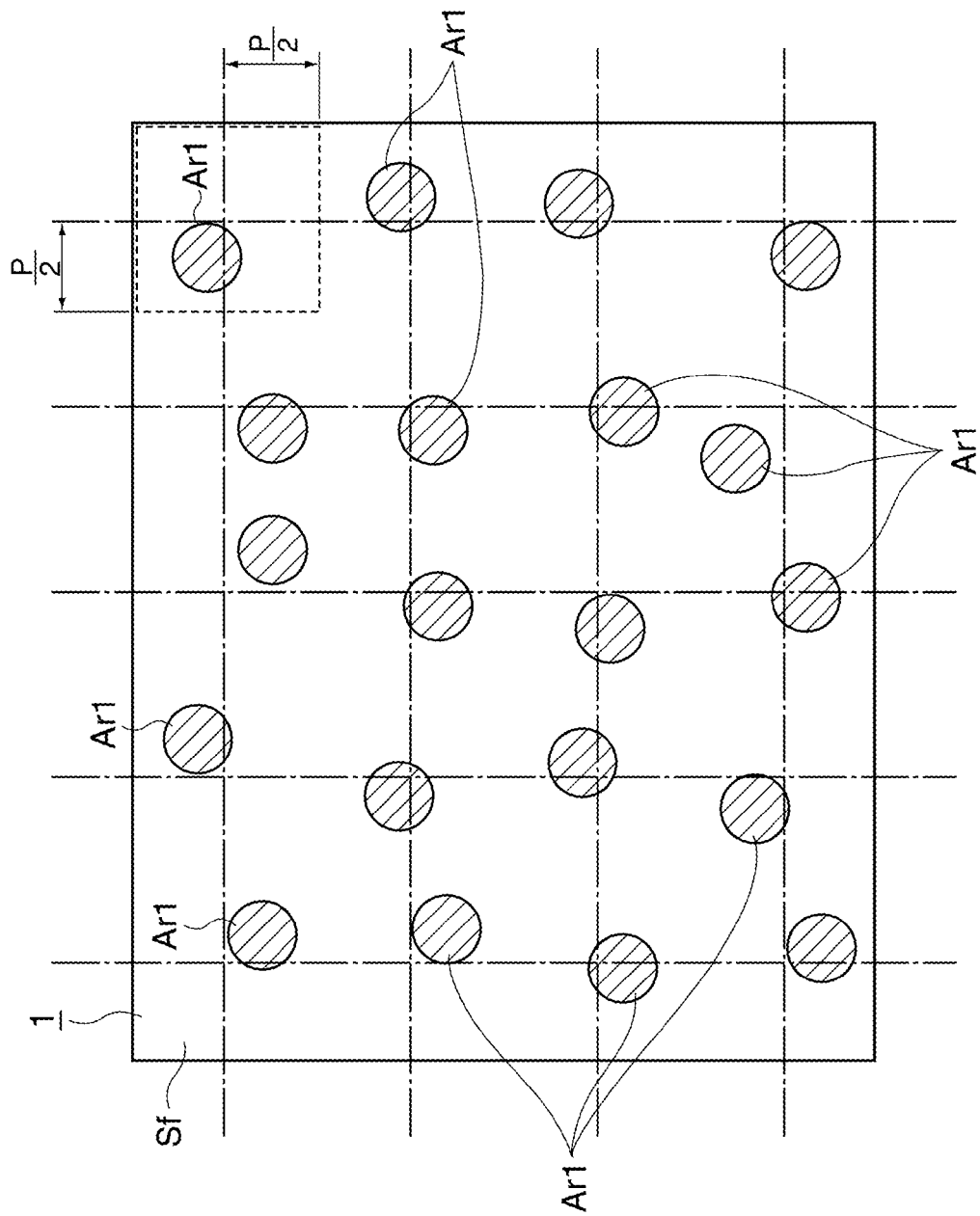
FIG. 17 shows a variation of the first embodiment.

FIG. 17 shows a variation of the first embodiment. Specifically, FIG. 17 corresponds to FIG. 5 and is a plan view for describing the positions where the light transmissive members 22 are formed.

In the first embodiment, the plurality of regions Ar1, where the second reflection portions 20B are provided, are provided over the entire projection surface Sf in such a way that they are regularly arranged in the row and column directions at the predetermined spacings P, but the plurality of regions Ar1 may be arranged differently.

For example, the plurality of regions Ar1 may be irregularly arranged, as shown in FIG. 17.

Specifically, in the example shown in FIG. 17, the plurality of regions Ar1 are irregularly shifted with respect to the positions thereof shown in FIG. 5 in such a way that the amount of shift is smaller than or equal to one-half the spacing P.

Further, the regions Ar3 may similarly be shifted in the fourth embodiment.

Figure 18A:
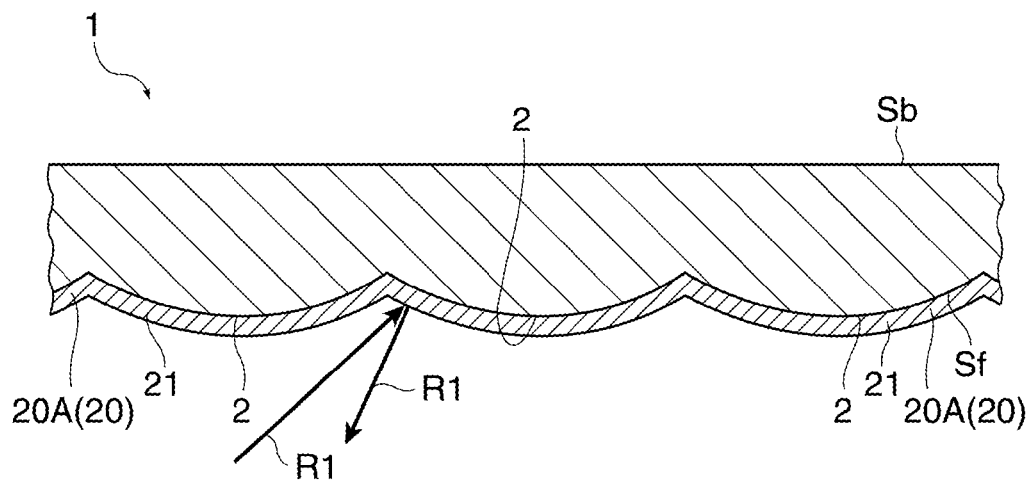
FIGS. 18A and 18B show another variation of the first embodiment.
Figure 18B:
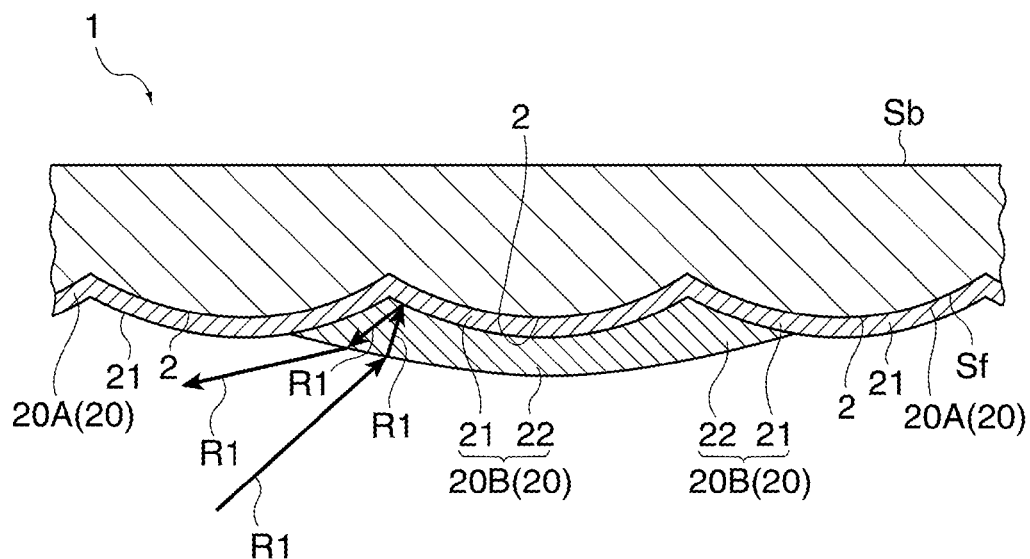

FIGS. 18A and 18B show another variation of the first embodiment. Specifically, FIGS. 18A and 18B are transverse cross-sectional views of part of the screen 1 (portions where the reflection films 21 are formed) taken along a horizontal plane and viewed in the direction along the vertical axis. FIG. 18A shows the behavior of the light incident on the region where no light transmissive members 22 are formed, and FIG. 18B shows the behavior of the light incident on the region where the light transmissive members 22 are formed. Further, the direction in which the image light R1 is incident is the same in FIGS. 18A and 18B.

In the first embodiment, the unit structure 2 has a concavely curved shape that forms part of a spherical surface. The unit structure 2 does not necessarily have a concavely curved shape but may alternatively have a convexly curved shape that forms part of a spherical surface, as shown in FIGS. 18A and 18B.

Even when the projection surface Sf is configured as shown in FIGS. 18A and 18B, the light transmissive member 22 formed by the forming step described in the first embodiment allows the regions Ar1, where the light transmissive members 22 are formed, to function as the second reflection portions 20B, as in the first embodiment.

This holds true in the fourth embodiment as well. That is, even when the projection surface Sf is configured as shown in FIGS. 18A and 18B, performing the blast process in the blasting step described in the fourth embodiment allows the regions Ar3, which have undergone the blast process, to function as the second reflection portions 20B, as in the fourth embodiment.

In the fourth embodiment, the second reflection portions 20B are provided by performing the blast process but may be provided differently.

For example, the second reflection portions 20B may be provided by using an inkjet technique or any other suitable technique in the light transmissive member forming step to apply a light diffusing member (such as an ink) onto the regions Ar3, which form part of the projection surface Sf, as in substantially the same manner in the first embodiment.

The invention can be used with a reflective screen having a projection surface on which image light is projected.

What is claimed is:

1. A reflective screen comprising:
a projection surface on which an image light is projected;
a plurality of unit structures provided on the projection surface, the plurality of unit structures each being formed of a concavely curved surface or a convexly curved surface;
at least one first unit structure of the plurality of unit structures including a first reflection portion that reflects the image light incident thereon toward a preset field of view such that a first viewer within the preset field of view recognizes a projected image, the first reflection portion being provided on the concavely curved surface or on the convexly curved surface of the at least one first unit structure; and
at least one second unit structure of the plurality of unit structures including a second reflection portion that reflects at least a part of the image light incident thereon toward a region outside the preset field of view such that a second viewer outside the preset field of view recognizes the projected image, the second reflection portion being provided on the concavely curved surface or on the convexly curved surface of the at least one second unit structure,
wherein:
the second reflection portion has a light transmissive member provided on a reflection surface that reflects light, and
the image light is refracted in the light transmissive member so that at least part of the incident image light is reflected toward the region outside the preset field of view.

2. The reflective screen to claim 1,
wherein one of the plurality of unit structures is formed of the concavely curved surface having predetermined curvature,
the plurality of unit structures includes a plurality of first unit structures and a plurality of third unit structures, one of the plurality of third unit structures having an extension surface extended from the concavely curved surface, the extension surface having an arcuate length longer than an arcuate length of one of the plurality of first unit structures in a cross-sectional view, and
the second reflection portion is provided on the extension surface.

3. The reflective screen according to claim 2,
wherein at least two third unit structures of the plurality of third unit structures are configured to be adjacent to each other,
the extension surfaces of the at least two third unit structures form a protrusion on the projection surface, the protrusion protruding outward from the projection surface,
the front end of the protrusion is formed of a concavely curved surface, and
a third reflection portion that reflects the image light incident thereon toward the preset field of view is provided on the front end of the protrusion.

4. The reflective screen according to claim 2,
wherein at least two third unit structures of the plurality of third unit structures are configured to be adjacent to each other,
the extension surfaces of the at least two third unit structures form a protrusion on the projection surface, the protrusion protruding outward from the projection surface,
the front end of the protrusion is formed of a flat surface, and
a fourth reflection portion that reflects at least part of the image light incident thereon toward the region outside the preset field of view is provided on the front end of the protrusion.

5. The reflective screen according to claim 1,
wherein the second reflection portion undergoes a diffusing process that allows the second reflection portion to diffuse and reflect light incident thereon so that at least part of the image light incident thereon is reflected toward the region outside the preset field of view.

* * * * *